United States Patent
Ohsugi et al.

(10) Patent No.: US 10,370,733 B2
(45) Date of Patent: Aug. 6, 2019

(54) METHOD OF ANNEALING METAL MEMBER

(71) Applicant: NIPPON STEEL & SUMITOMO METAL CORPORATION, Tokyo (JP)

(72) Inventors: Yasuo Ohsugi, Tokyo (JP); Tsuyoshi Hamaya, Tokyo (JP); Satoshi Arai, Tokyo (JP); Eiji Yanagida, Okazaki (JP); Shinya Sano, Toyota (JP); Masaaki Kondo, Nagoya (JP); Toshimitsu Takahashi, Toyota (JP); Yoji Sato, Kasugai (JP)

(73) Assignee: NIPPON STEEL CORPORATION, Tokyo (JP)

( * ) Notice: Subject to any disclaimer, the term of this patent is extended or adjusted under 35 U.S.C. 154(b) by 749 days.

(21) Appl. No.: 14/124,131

(22) PCT Filed: Jan. 22, 2013

(86) PCT No.: PCT/JP2013/051149
§ 371 (c)(1),
(2) Date: Dec. 5, 2013

(87) PCT Pub. No.: WO2013/111726
PCT Pub. Date: Aug. 1, 2013

(65) Prior Publication Data
US 2014/0126894 A1 May 8, 2014

(30) Foreign Application Priority Data
Jan. 25, 2012 (JP) ................................. 2012-013403

(51) Int. Cl.
*F27B 5/14* (2006.01)
*C21D 9/00* (2006.01)
(Continued)

(52) U.S. Cl.
CPC ............. *C21D 9/0068* (2013.01); *C21D 1/26* (2013.01); *C21D 1/34* (2013.01); *C21D 9/00* (2013.01);
(Continued)

(58) Field of Classification Search
CPC .................................. H05B 6/16; C21D 1/26
(Continued)

(56) References Cited

U.S. PATENT DOCUMENTS 3,633,891 A   1/1972  Heran
4,477,306 A * 10/1984  Rediger ............... H02K 15/024
                                              118/256
(Continued)

FOREIGN PATENT DOCUMENTS

CN    1808841    7/2006
EP    1677408    7/2006
(Continued)

OTHER PUBLICATIONS

Machine translation of JP20101236795A of Minoue.*
(Continued)

*Primary Examiner* — Joseph M Pelham
(74) *Attorney, Agent, or Firm* — Birch, Stewart, Kolasch & Birch, LLP

(57) ABSTRACT

A method of annealing a metal member includes: disposing a first heater in an inner space of a hollow cylindrical metal member having an inner peripheral surface provided with plural teeth protruding toward a central direction, the first heater radiating infrared light and being disposed so as to extend parallel to a direction of a central axis of the metal member; heating the metal member from the inner space with the first heater; and gradually cooling the metal member after heating.

13 Claims, 11 Drawing Sheets

(51) Int. Cl.
*F27D 11/02* (2006.01)
*H02K 15/02* (2006.01)
*H02K 15/12* (2006.01)
*C21D 1/34* (2006.01)
*C21D 1/26* (2006.01)
*C21D 8/12* (2006.01)
*C21D 1/09* (2006.01)

(52) U.S. Cl.
CPC ............ *F27B 5/14* (2013.01); *F27D 11/02* (2013.01); *H02K 15/024* (2013.01); *H02K 15/12* (2013.01); *C21D 1/09* (2013.01); *C21D 8/12* (2013.01); *F27B 2005/143* (2013.01)

(58) Field of Classification Search
USPC .......... 392/407, 425–428; 219/391, 402–411
See application file for complete search history.

(56) References Cited

U.S. PATENT DOCUMENTS

| | | | | |
|---|---|---|---|---|
| 4,500,366 | A * | 2/1985 | Kokai | C21D 1/34 148/111 |
| 4,621,794 | A * | 11/1986 | Kokai | C21D 1/34 266/256 |
| 4,771,153 | A * | 9/1988 | Fukushima | H05B 6/645 219/696 |
| 5,095,192 | A * | 3/1992 | McEntire | F27B 14/061 219/390 |
| 6,057,532 | A * | 5/2000 | Dexter | H05B 3/0076 219/553 |
| 6,174,388 | B1 | 1/2001 | Sikka | |
| 6,437,292 | B1 * | 8/2002 | Sikka | C21D 1/09 219/386 |
| 6,800,833 | B2 * | 10/2004 | Gregor | C30B 25/12 118/715 |
| 8,467,668 | B2 * | 6/2013 | Searle | F24H 3/0417 219/210 |
| 8,674,274 | B2 * | 3/2014 | Parsche | H05B 6/72 219/411 |
| 2009/0096953 | A1 * | 4/2009 | Tanaka | G02F 1/133603 349/61 |

FOREIGN PATENT DOCUMENTS

| | | |
|---|---|---|
| JP | 54-001803 | 1/1979 |
| JP | 59-123719 | 7/1984 |
| JP | 61-214746 | 9/1986 |
| JP | 11-332183 | 11/1999 |
| JP | 2001-192728 | 7/2001 |
| JP | 2003-342637 | 12/2003 |
| JP | 2007-059819 | 3/2007 |
| JP | 2008-285746 | 11/2008 |
| JP | 2010-126795 | 6/2010 |

OTHER PUBLICATIONS

Machine translation of JP2003342637 (Koshiishi), also listed in the iDS of Dec. 5, 2013, obtained from EPO.*
International Search Report dated Apr. 2, 2013 issued in corresponding PCT Application No. PCT/JP2013/051149 [With English Translation].
Office Action dated Jun. 24, 2015 issued in corresponding CN Application No. 201380001827.8 [With English Translation].
European Search Report dated Jul. 17, 2015 issued in corresponding EP Application No. 13741187.2.

* cited by examiner

FIG. 10

TABLE  MAXIMUM TEMPERATURE AT RESPECTIVE MEASUREMENT POINT

| MEASUREMENT POINT | MAXIMUM TEMPERATURE(°C) |
|---|---|
| A | 765.4 |
| B | 789.2 |
| C | 710.4 |
| D | 713.9 |
| E | 772.6 |
| F | 808.3 |
| G | 714.2 |
| H | 724.2 |

METHOD OF ANNEALING METAL MEMBER

TECHNICAL FIELD

The present invention relates to a method of annealing a metal member having a hollow cylindrical shape. More specifically, the present invention relates to a method of annealing a metal member favorable for annealing a laminated core formed by laminating, for example, electromagnetic steel sheets, and the annealing method is directed to removing strain to reduce iron losses. This application is a national stage application of International Application No. PCT/JP2013/051149, filed Jan. 22, 2013, which claims priority to Japanese Patent Application No. 2012-013403 filed in Japan on Jan. 25, 2012, the disclosures of which are incorporated herein by reference in their entirety.

BACKGROUND ART

General laminated cores for use in electric motors are formed by punching an electromagnetic steel sheet into a predetermined shape, laminating the punched sheets, and joining the sheets, for example, through welding or caulking. However, during the punching, strain may occur in the electromagnetic steel sheet. Once the strain occurs in the electromagnetic steel sheet, the iron loss increases and energy efficiency of the electric motor deteriorates. Thus, for example, as described in Patent Documents 1 to 3, annealing may be performed to remove the strain after the punched electromagnetic steel sheets are laminated and joined.

RELATED ART DOCUMENTS

Patent Documents

Patent Document 1: Japanese Unexamined Patent Application, First Publication No. S54-1803
Patent Document 2: Japanese Unexamined Patent Application, First Publication No. H11-332183
Patent Document 3: Japanese Unexamined Patent Application, First Publication No. S59-123719

DISCLOSURE OF THE INVENTION

Problems To be Solved by the Invention

The method of annealing a laminated core formed by the electromagnetic steel sheet includes, for example, heating to 750° C. or higher using a heating furnace, keeping heating for approximately two hours so as to uniformly heat, and thereafter gradually cooling. As described above, to anneal the laminated core, it is necessary to heat the laminated core for a long period of time. This leads to a problem of poor productivity of annealing of the laminated core. In this regard, there is a demand to reduce the time required for heating to improve the productivity. In connection with the reduction in the time required for heating, for example, Patent Document 3 discloses a configuration of induction heating applied to a laminated core. However, Patent Document 3 does not disclose any specific heating method. Further, as for the method of heating in a short period of time, there is a method of applying electric power to the laminated core to heat with Joule heating. However, with the method of heating through electric power, it is difficult to uniformly bring the electrodes into contact with the laminated core if the size of the laminated core is large. Thus, it is difficult to uniformly heat the laminated core in a short period of time.

The present invention has been made in view of the problems described above, and an object of the present invention is to reduce a time required for heating in annealing a metal member having a hollow cylindrical shape such as a laminated core formed by laminating electromagnetic steel sheets, thereby improving productivity.

Means for Solving the Problem

The following is a summary of the present invention.
(1) An aspect of the present invention provides a method of annealing a metal member, including: disposing a first heater in an inner space of a hollow cylindrical metal member having an inner peripheral surface provided with multiple teeth protruding toward a center direction, the first heater radiating infrared light and being disposed so as to extend parallel to a direction of a central axis of the metal member; heating the metal member from the inner space by the first heater; and gradually cooling the metal member after heating.
(2) In the method of annealing a metal member according to (1) above, first heaters may be arranged in a circumferential direction at an equal interval.
(3) In the method of annealing a metal member according to (2) above, a first separator that blocks between the first heaters may be disposed so as to extend along the central axis of the metal member.
(4) In the method of annealing a metal member according to (3) above, the first separator may be made of at least one of white ceramic and aluminum.
(5) In the method of annealing a metal member according to (2) above, each of the first heaters may be disposed between the teeth.
(6) In the method of annealing a metal member according to (5) above, a second separator that extends along the direction of the central axis of the metal member may be disposed in the inner space of the metal member.
(7) In the method of annealing a metal member according to (6) above, the second separator may be made of at least one of white ceramic and aluminum.
(8) In the method of annealing a metal member according to any one of (1) to (7) above, metal members may be layered in the direction of the central axis, the first heater may be inserted in the inner space of the metal members, and the metal members may be heated at the same time.
(9) In the method of annealing a metal member according to (8) above, the first heater may be a halogen heater.
(10) In the method of annealing a metal member according to (1) to (9) above, a second heater may be further disposed on a side of an outer periphery of the metal member so as to extend parallel to the direction of the central axis of the metal member, and the metal member may be heated by the second heater from the side of the outer periphery.
(11) In the method of annealing a metal member according to (10) above, the second heater may be a heater that radiates infrared light.
(12) In the method of annealing a metal member according to (11) above, the second heater may be a halogen heater.
(13) In the method of annealing a metal member according to any one of (1) to (12) above, the metal member may be a laminated core formed by laminating electromagnetic steel sheets.

Effects of the Invention

According to the present invention, it is possible to heat the metal member from the inner space by infrared light radiated from a first heater disposed so as to extend parallel to the central axis direction of the metal member. Further, it is possible to bring the first heater close to the teeth at equal distances throughout the entire length of the central axis direction of each of the teeth formed on the inner peripheral surface of the metal member. This makes it possible to reduce the time required for heating, compared to the configuration of heating the metal member by a heating furnace. Thus, it is possible to improve productivity concerning annealing the metal member. Further, the teeth formed on the inner peripheral surface of the metal member can be heated, which makes it possible to maintain and enhance the effect of removing the strain occurring in the teeth, and further reducing the iron loss. As described above, according to the present invention, it is possible to improve the productivity by reducing the heating time, and at the same time, to prevent deterioration in the effect of reducing iron loss during annealing.

BRIEF DESCRIPTION OF THE DRAWINGS

FIG. 10 is a table showing the maximum temperatures at measurement points of the laminated core in Examples of the present invention.

EMBODIMENTS OF THE INVENTION

Hereinbelow, embodiments and examples of the present invention will be described in detail with reference to the drawings. In this specification, a laminated core is described as an example of the metal member. However, the metal member according to the present invention is not limited to the laminated core.

(First Embodiment)

Figure 1A:
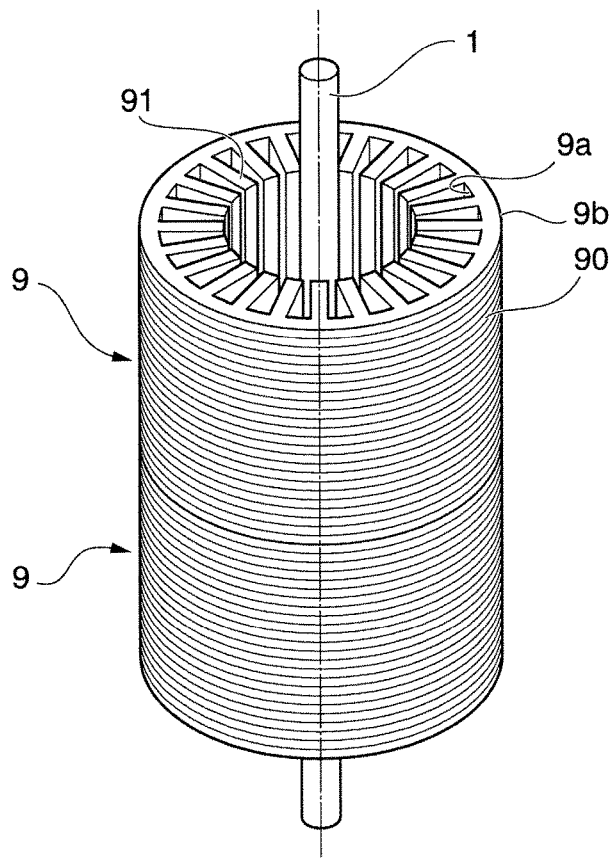
FIG. 1A is a perspective view schematically illustrating a method of annealing a laminated core according to a first embodiment of the present invention.
Figure 1B:
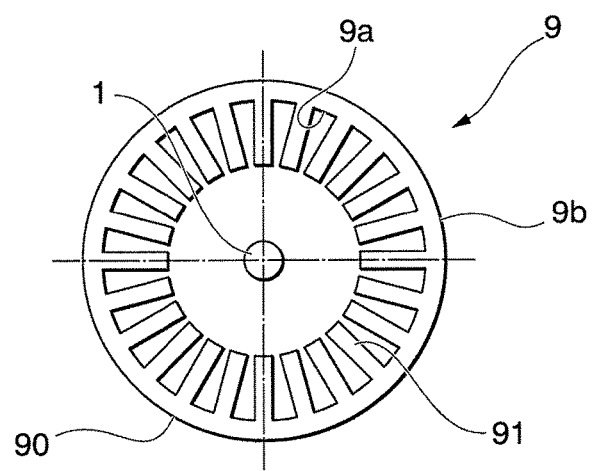
FIG. 1B is a plan view schematically illustrating a method of annealing a laminated core according to the first embodiment of the present invention.
Figure 2A:
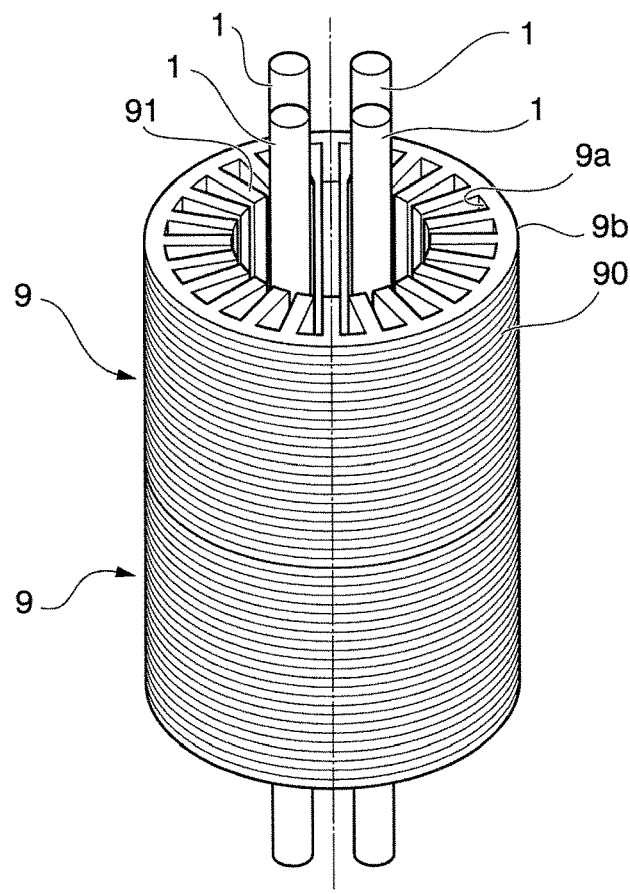
FIG. 2A is a perspective view schematically illustrating a method of annealing a laminated core according to the first embodiment of the present invention.
Figure 2B:
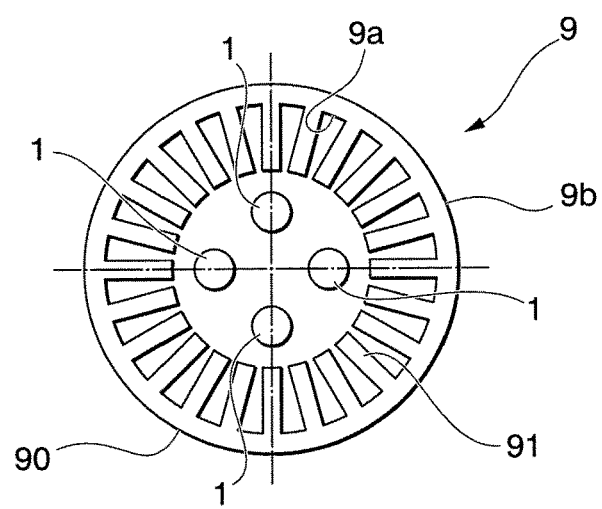
FIG. 2B is a plan view schematically illustrating a method of annealing a laminated core according to the first embodiment of the present invention.

FIG. 1A and FIG. 2A are perspective views each schematically illustrating a method of annealing a laminated core according to a first embodiment. FIG. 1B and FIG. 2B are plan views each schematically illustrating a method of annealing a laminated core according to the first embodiment.

The method of annealing a laminated core according to the first embodiment is capable of annealing a laminated core 9 having a conventional general configuration. The configuration of the laminated core 9 will be briefly described below. The laminated core 9 is formed by laminating electromagnetic steel sheets 90 that have been punched into a predetermined shape, and has a hollow cylindrical shape as a whole. The laminated core 9 has an inner peripheral surface 9a having teeth 91 formed thereon. The teeth 91 are each configured so as to protrude toward the center in the radial direction, and are arranged in the circumferential direction so as to be spaced away from each other at a predetermined distance.

As illustrated in FIG. 1A, FIG. 1B, FIG. 2A, and FIG. 2B, the method of annealing a laminated core according to the first embodiment employs one or more first heater(s) 1 that radiates infrared light for heating the laminated core 9. The first heater(s) 1 is disposed so as to extend parallel to the direction of the central axis of the laminated core 9. More specifically, the first heater(s) 1 includes, for example, a bar-like halogen heater (also referred to as a halogen lamp heater) that radiates a near infrared light (infrared light with the wavelength bandwidth ranging from 0.78 µm to 2.0 µm) or infrared light with the wavelength bandwidth of near infrared. The halogen heater has, for example, a configuration in which a tungsten filament is provided within a cylindrical quartz glass tube, and inert gas and halogen material are enclosed therein. Further, the tungsten filament radiates the infrared light upon application of electric power.

It should be noted that various types of known halogen heaters may be applied to the first heater 1 in the first embodiment. Thus, a detailed description thereof will be omitted.

The one or more first heater(s) 1 is inserted into the inner space of the laminated core 9, and is provided so as to be able to radiate infrared light directly onto the surface of the teeth 91. For example, in the case of the configuration in which a single first heater 1 is used as illustrated in FIG. 1A and FIG. 1B, the first heater 1 that can radiate the infrared light toward all circumferential directions is provided at the center of inner space of the laminated core 9. Further, in the case of the configuration in which a plurality of first heaters 1 are used as illustrated in FIG. 2A and FIG. 2B, the first heaters 1 are provided at positions brought close to the teeth 91 formed on the inner peripheral surface 9a of the laminated core 9 (in other words, at positions shifted from the center of the inner space of the laminated core 9 toward the outward in the radial direction).

Further, it is preferable for the axis of the one or more bar-like first heater(s) 1 to be located parallel to the central axis direction of the laminated core 9 so as to be able to uniformly heat the entire length of the teeth 91 in the central axis direction. With these configurations, it is possible to dispose the first heater(s) 1 so as to be brought close to the teeth 91 with equal distances maintained throughout the entire length of the teeth 91. Thus, the first heater(s) 1 can directly radiate the infrared light that has uniform intensity onto the entire length of the teeth 91 in the central axis direction. Further, the distances between the first heater(s) 1 and the inner peripheral surface 9a of the laminated core 9 or the surface of each of the teeth 91 are uniformly set. Furthermore, a plurality of the first heaters 1 are arranged in the circumferential direction at equal intervals.

Then, the laminated core 9 is heated using the first heater(s) 1 until the laminated core 9 reaches a target temperature. Since the first heater(s) 1 is disposed in the inner space of the laminated core 9, the laminated core 9 is heated from the inner space (in other words, the inner peripheral surface 9a having the teeth 91 formed thereon). Note that the target temperature is preferably set to 700° C. or higher. Further, the target temperature may be set to 750° C., which is equal to the heating temperature in the conventional method of annealing a laminated core.

After the laminated core 9 is heated to the target temperature, heating by the first heater(s) 1 is stopped. Then, the laminated core 9 is gradually cooled. The conditions of the gradual cooling (such as cooling method and temperature history) may be the same as those of the conventional method of annealing a laminated core. For example, conventional general furnace cooling or air cooling may be used. Thus, explanation thereof will be omitted.

In the first embodiment, gradual cooling starts immediately after the laminated core 9 reaches the target temperature. In other words, in the conventional method of annealing a laminated core that heats using a heating furnace, even after the laminated core 9 reaches the target temperature, heating continues for a predetermined period of time (for example, for approximately 2 hours) to make temperatures uniform. Thus, in the conventional method of annealing a laminated core, the "time required for the laminated core 9 to reach the target temperature" and the "time required for making temperatures uniform" are necessary as the heating time. On the other hand, in the method of annealing a laminated core according to the first embodiment, only the "time required for the laminated core 9 to reach the target temperature" is necessary as the heating time, and the "time required for making temperatures uniform" is not necessary.

Figure 3:
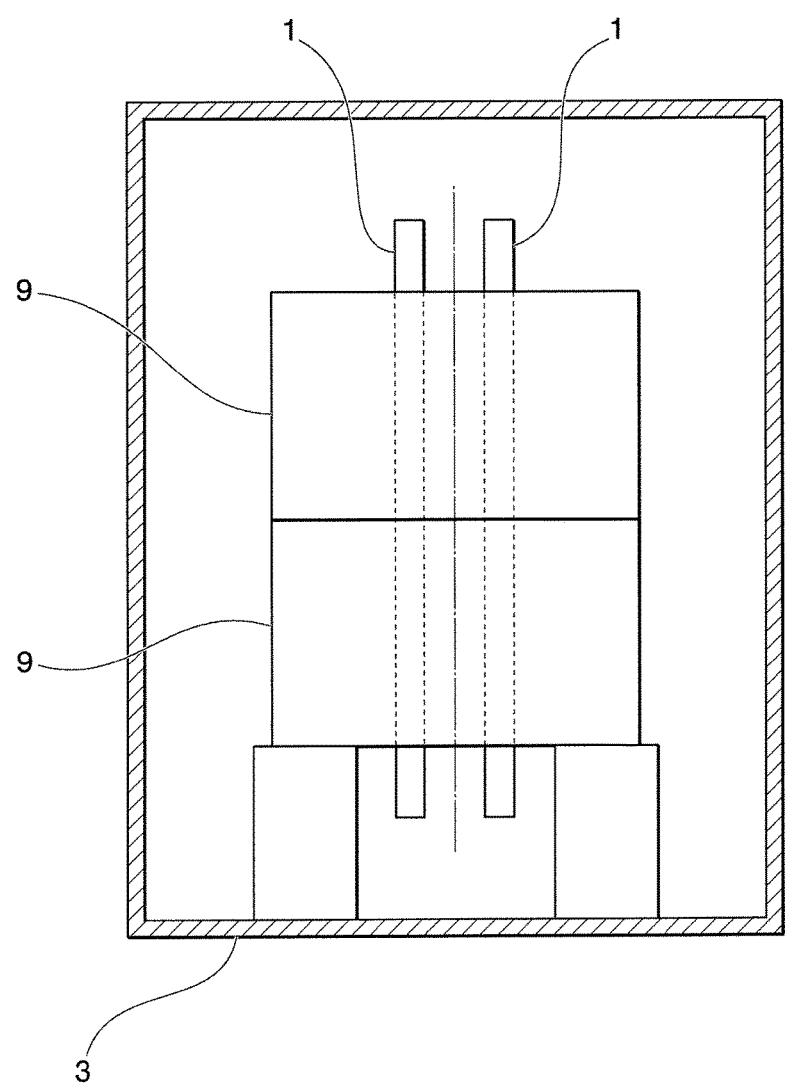
FIG. 3 is a sectional view schematically illustrating a method of annealing a laminated core according to the first embodiment of the present invention.

It is preferable to heat and cool the laminated core 9 in a non-oxidizing environment to prevent oxidization of the electromagnetic steel sheets 90 forming the laminated core 9. For example, it may be possible to employ a configuration in which a chamber 3 as illustrated in FIG. 3 is filled with a non-oxidizing gas, and the laminated core 9 is heated and cooled within the chamber 3. Note that the configuration of the chamber 3 is not specifically limited, and various types of conventionally known chambers may be used. This means that it is only necessary to use a configuration that can maintain the inside of the chamber to be the non-oxidizing environment. Further, in the first embodiment, the laminated core 9 is heated using the first heater(s) 1, and hence, it may be possible that the chamber 3 does not have any heater.

According to the first embodiment, the laminated core 9 is heated from the inner space with the infrared light radiated from the first heater(s) 1. Since the one or more first heater(s) 1 is disposed in the inner spaced of the cylindrical laminated core 9, the infrared light can be uniformly radiated throughout the entire surface of the teeth 91 formed on the inner peripheral surface 9a of the laminated core 9. Further, compared to the method of annealing a laminated core employing the conventional heating furnace, with the first embodiment according to the present invention, it is possible to bring the heat source (infrared light source) close to the surfaces of the teeth 91, so that the laminated core 9 can be uniformly heated in a short period of time. This makes it possible to reduce the "time required for the laminated core 9 to reach the target temperature." In particular, with the configuration employing the first heater(s) 1 radiating the near infrared light, it is possible to improve responsiveness concerning raising temperatures. Thus, it is possible to raise temperatures of the laminated core 9 in a short period of time.

Further, according to the first embodiment, it is possible to start the gradual cooling immediately after the laminated core 9 reaches the target temperature, without the need to keep heating for the purpose of making temperatures uniform. Thus, it is possible to omit the "time required for making temperatures uniform," and reduce the heating time.

As described above, according to the first embodiment, it is possible to reduce the heating time in annealing, whereby it is possible to improve the productivity concerning the laminated core 9.

Further, according to the first embodiment, it is possible to reduce iron loss while reducing the time required for heating the laminated core 9. In other words, each of the electromagnetic steel sheets 90 subjected to the punching process has the outer peripheral surface 9b having a substantially simple circular shape, whereas the inner peripheral surface 9a has teeth 91 formed thereon and hence, has an uneven surface. Thus, compared to the outer peripheral surface 9b, the inner peripheral surface 9a of the laminated core 9 has an elongated cut end, and has increased strain. Thus, to reduce the iron loss, it is necessary to enhance the effect of annealing especially on the inner peripheral surface 9a to remove the strain. In the first embodiment, the first heater 1 is disposed in the inner space of the laminated core 9. The laminated core 9 is heated from the inner space thereof by the infrared light that is radiated directly onto the surface of each of the teeth 91 formed on the inner peripheral surface 9a of the laminated core 9. Thus, it is possible to reliably raise temperatures of the inner peripheral surface 9a of the laminated core 9 to the target temperature. Further, the inner peripheral surface 9a reaches the target temperature earlier than the outer peripheral surface 9b, and hence, it is possible to subject the inner peripheral surface 9a to the target temperature longer than the outer peripheral surface 9b. This makes it possible to enhance the effect of annealing on the inner peripheral surface 9a, and reduce iron loss. As described above, according to the first embodiment, it is possible to reduce iron loss while reducing the heating time.

In the case where a plurality of laminated cores 9 are annealed, the laminated cores 9 are disposed so as to be layered (or arranged) in the central axis direction, and one or more first heater(s) 1 is disposed so as to collectively penetrate the inner space of the layered laminated cores 9. With the configuration as described above, it is possible to heat the laminated cores 9 at the same time, and hence, it is possible to improve the productivity of the laminated cores 9. Note that FIG. 1A, FIG. 1B, FIG. 2A, and FIG. 2B each illustrate a configuration in which two laminated cores 9 are layered. However, the number of laminated cores 9 layered is not limited.

Further, FIG. 1A, FIG. 1B, FIG. 2A, and FIG. 2B each illustrate a configuration in which the first heater(s) 1 is formed in a straight manner. However, the shape of the first heater 1 is not limited. For example, the first heater 1 may have a U-shape. Yet further, FIG. 2A and FIG. 2B each illustrate a configuration in which four first heaters 1 are used. However, the number of the first heaters 1 is not limited.

(Second Embodiment)

Figure 4A:
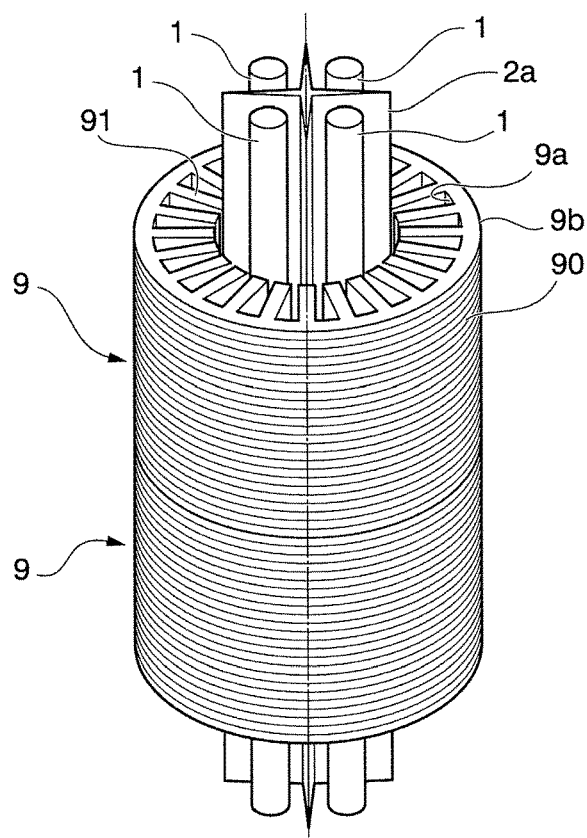
FIG. 4A is a perspective view schematically illustrating a method of annealing a laminated core according to a second embodiment of the present invention.
Figure 4B:
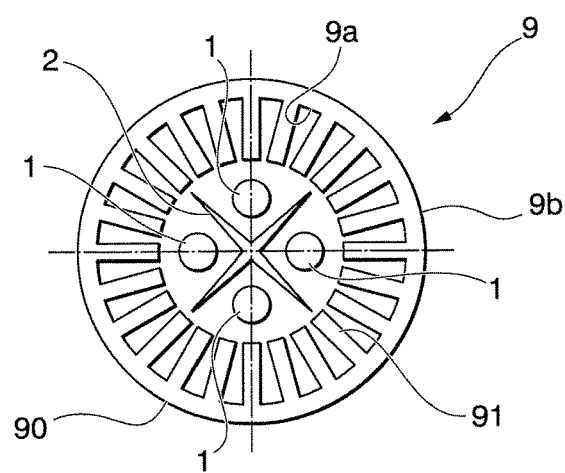
FIG. 4B is a plan view schematically illustrating a method of annealing a laminated core according to the second embodiment of the present invention.

Next, a second embodiment according to the present invention will be described. Note that the configuration common to that of the first embodiment will not be described. FIG. 4A is a perspective view schematically illustrating a method of annealing a laminated core according to the second embodiment. FIG. 4B is a plan view schematically illustrating a method of annealing a laminated core according to the second embodiment.

As illustrated in FIG. 4A and FIG. 4B, the first heaters 1 are inserted in the inner space of the laminated core 9, and are disposed so as to be brought close to the teeth 91. Further, a first separator 2a is provided between the first heaters 1. The first separator 2a has a function of blocking the infrared light coming from the adjacent first heaters 1 in a manner such that the first heaters 1 do not directly radiate the infrared light onto each other. Further, the first separator 2a also has a function of reflecting the infrared light radiated from each of the first heaters 1 toward the surface of the teeth 91. To this end, the first separator 2a is made out of a material that blocks and reflects the infrared light. For example, the first separator 2a is made out of white ceramic or aluminum.

The first separator 2a has a portion that intervenes between the first heaters 1. For example, as illustrated in FIG. 4A and FIG. 4B, the first separator 2a has sheet-like portions protruding radially outward, and each of these sheet-like portions intervenes between the first heaters 1. In other words, the first separator 2a has a configuration in which recessed portions extending along the central axis direction of the laminated core 9 are formed on the perimeter of the first separator 2a. In the recessed portions, the first heaters 1 are placed.

Moreover, it may be possible to employ a configuration in which independent first separators 2a are disposed between the adjacent first heaters 1. It is only necessary that the first separator 2a has a portion that intervenes between the first heaters 1 and has a configuration that can prevent the first heaters 1 from directly radiating the infrared light onto each other.

According to the second embodiment, it is possible to obtain a similar operation and effect to the first embodiment. Further, according to the second embodiment, with the first separator 2a, it is possible to prevent the first heaters 1 from directly radiating the infrared light onto each other. Thus, it is possible to prevent the first heaters 1 from directly heating each other, thereby protecting the first heaters 1.

Further, the first separator 2a reflects the infrared light radiated from the first heaters 1 toward the teeth 91. Thus, according to the second embodiment, it is possible to improve the thermal efficiency, whereby it is possible to further reduce the time required for heating the laminated core 9.

(Third Embodiment)

Figure 5A:
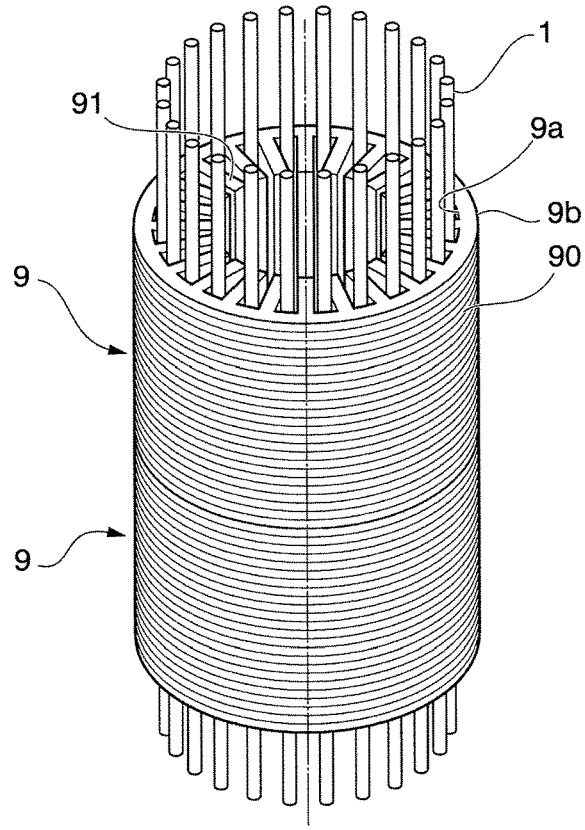
FIG. 5A is a perspective view schematically illustrating a method of annealing a laminated core according to a third embodiment of the present invention.
Figure 5B:
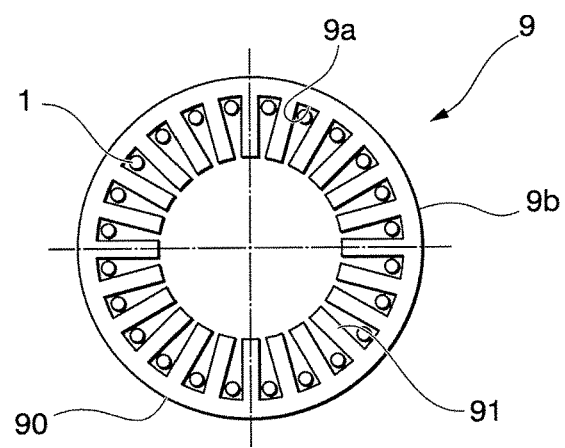
FIG. 5B is a plan view schematically illustrating a method of annealing a laminated core according to the third embodiment of the present invention.

Next, a third embodiment according to the present invention will be described. Note that the configuration common to that of the first embodiment will not be described. FIG. 5A is a perspective view schematically illustrating a method of annealing a laminated core according to the third embodiment. FIG. 5B is a plan view schematically illustrating a method of annealing a laminated core according to the third embodiment.

As illustrated in FIG. 5A and FIG. 5B, in the third embodiment, the first heaters 1 are inserted in the inner space of the laminated core 9, and are disposed between the teeth 91 formed on the inner peripheral surface 9a of the laminated core 9. Further, the laminated core 9 is heated from the inner space by the first heaters 1 disposed between the teeth 91.

According to the third embodiment, it is possible to bring the first heaters 1 close to the surface of the teeth 91 formed on the inner peripheral surface 9a of the laminated core 9. In particular, compared to the configuration in which the first heaters 1 are disposed radially inward of the teeth 91 (in other words, located closer to the center of the laminated core 9), it is possible to more strongly radiate the infrared light to the end surface of the teeth 91 in the circumferential direction (in other words, the surface facing the adjacent tooth 91). This makes it possible to further improve the thermal efficiency, whereby it is possible to further reduce the heating time.

Further, according to the third embodiment, with the teeth 91 formed on the inner peripheral surface 9a of the laminated core 9, it is possible to prevent the first heaters 1 from radiating the infrared light directly onto each other. In other words, it is possible to make the teeth 91 formed on the inner peripheral surface 9a of the laminated core 9 function as the first separator 2a in the second embodiment. Thus, it is possible to protect the first heaters 1.

(Fourth Embodiment)

Figure 6A:
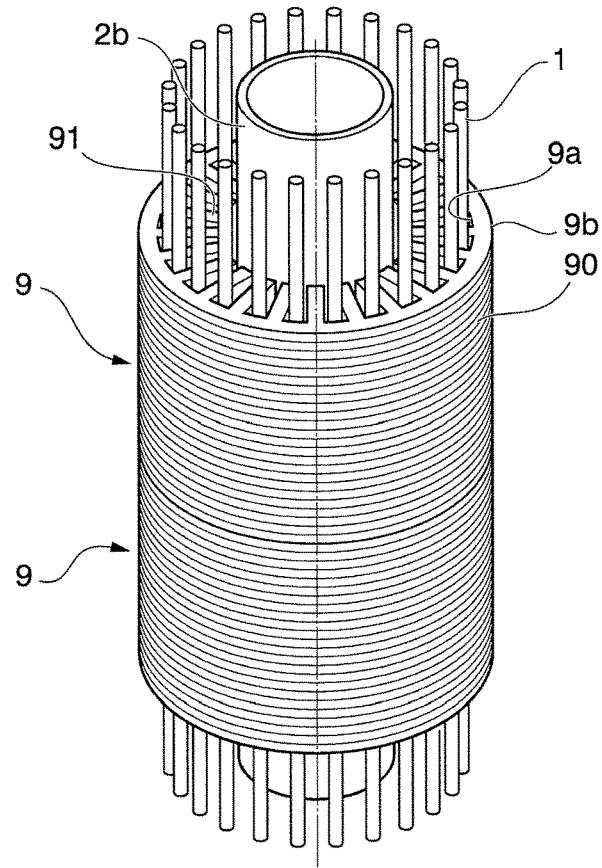
FIG. 6A is a perspective view schematically illustrating a method of annealing a laminated core according to a fourth embodiment of the present invention.
Figure 6B:
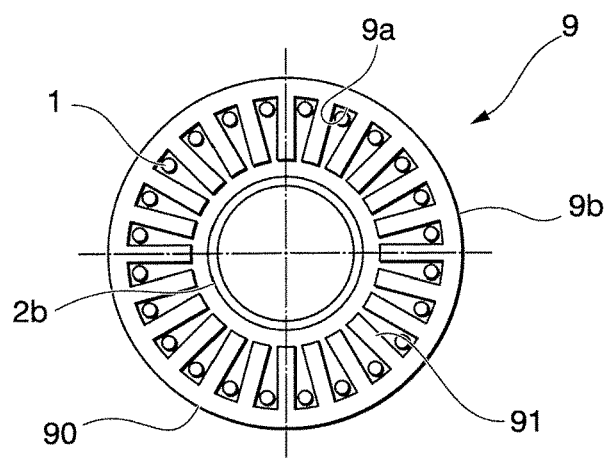
FIG. 6B is a plan view schematically illustrating a method of annealing a laminated core according to the fourth embodiment of the present invention.

Next, a fourth embodiment according to the present invention will be made. The fourth embodiment has a configuration in which the separator is applied to the third embodiment. Thus, the configuration common to that of the third embodiment will not be described. FIG. 6A is a perspective view schematically illustrating a method of annealing a laminated core according to the third embodiment. FIG. 6B is a plan view schematically illustrating a method of annealing a laminated core according to the third embodiment.

As illustrated in FIG. 6A and FIG. 6B, in the fourth embodiment, the first heaters 1 are inserted in the inner space of the laminated core 9, and are disposed between the adjacent teeth 91 formed on the inner peripheral surface 9a of the laminated core 9. Further, a second separator 2b is disposed closer to the center in the radial direction than each of the teeth 91 (in other words, in the inner space) in a manner such that the second separator 2b extends along the central axis direction of the laminated core 9. The second separator 2b has a function of reflecting, toward the radially outward direction, the infrared light radiated from each of the first heaters 1 toward the center in the radial direction. It may be possible to employ, for example, a configuration in which the second separator 2b has a cylindrical or column-like shape that can be inserted in the inner space of the laminated core 9.

Further, the second separator 2b is formed by a material that blocks and reflects the infrared light. For example, the second separator 2b is made out of white ceramic or aluminum.

According to the fourth embodiment, it is possible to obtain a similar operation and effect to the third embodiment. Further, in the fourth embodiment, the infrared light radiated from each of the first heaters 1 toward the center in the radial direction is reflected by the second separator 2b toward the radially outward direction (in other words, toward the inner peripheral surface 9a of the teeth 91). This makes it possible to further improve the thermal efficiency, whereby it is possible to further reduce the heating time.

(Fifth Embodiment)

Figure 7A:
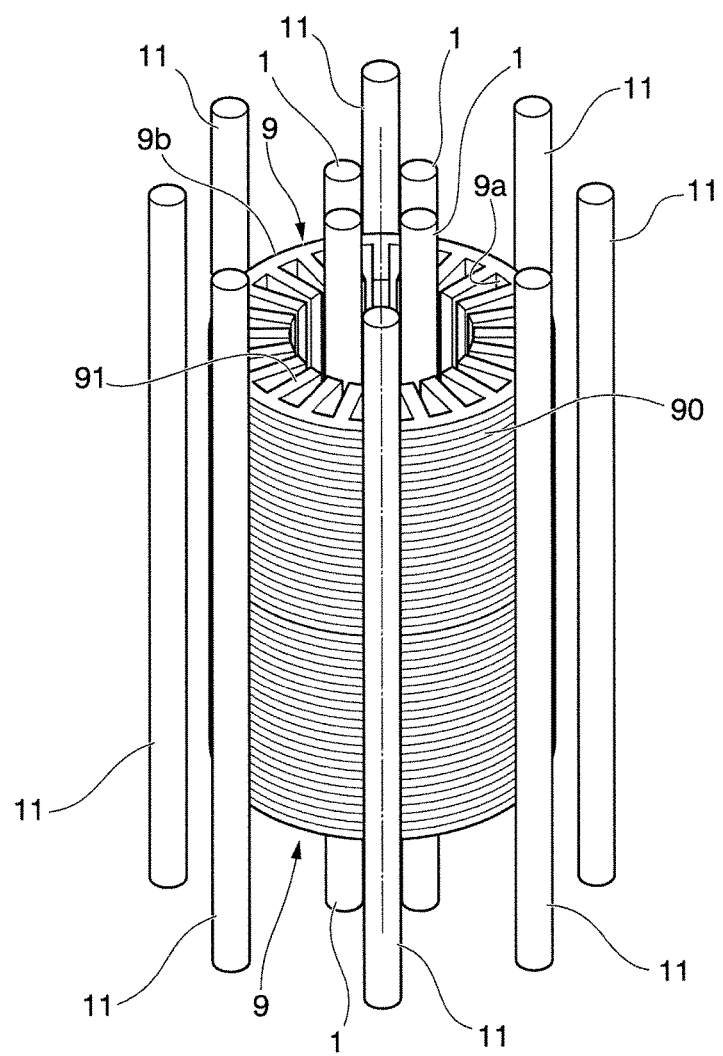
FIG. 7A is a perspective view schematically illustrating a method of annealing a laminated core according to a fifth embodiment of the present invention.
Figure 7B:
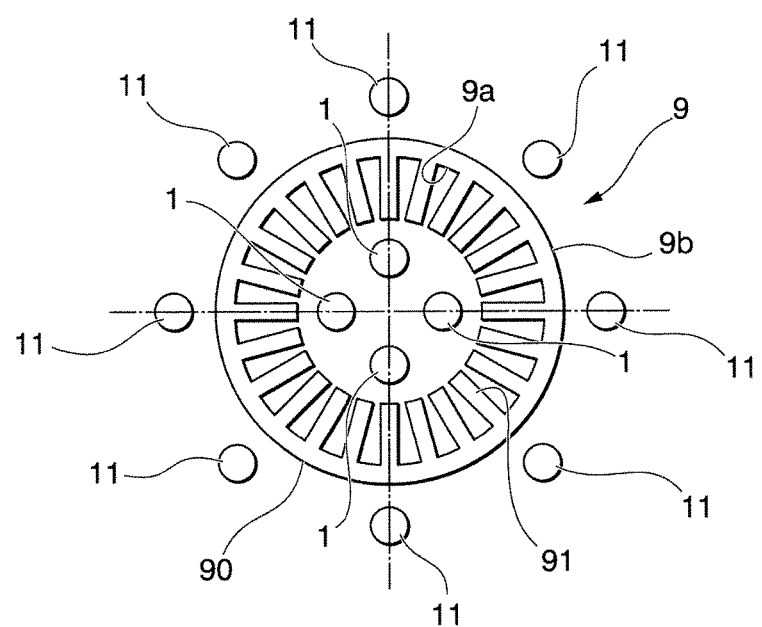
FIG. 7B is a plan view schematically illustrating a method of annealing a laminated core according to the fifth embodiment of the present invention.

Next, a fifth embodiment will be described. FIG. 7A is a perspective view schematically illustrating a method of annealing a laminated core according to a fifth embodiment. FIG. 7B is a plan view schematically illustrating a method of annealing a laminated core according to the fifth embodiment. As illustrated in FIG. 7A and FIG. 7B, in the fifth embodiment, the first heaters 1 are inserted in the inner space of the laminated core 9, and second heaters 11 extending along the central axis direction of the laminated core 9 are disposed at the outer peripheral side of the laminated core 9, thereby applying heat. Note that FIG. 7A and FIG. 7B each illustrate a configuration in which the first embodiment is applied for the first heaters 1 inserted in the inner space of the laminated core 9. However, it may be possible to employ a configuration in which any of the second to the fourth embodiments is applied.

According to the fifth embodiment, it is possible to obtain a similar operation and effect to each of the embodiments described above. Further, according to the fifth embodiment, heat is applied to the laminated core 9 from the outer peripheral side. Thus, it is possible to increase the amount of heat per unit of time applied to the laminated core 9. Further, with the configuration in which the laminated core 9 is also heated from the outer peripheral side, the heat applied from the inner side surface 9a can be prevented from moving to the outer peripheral surface 9b and radiating from the outer peripheral surface 9b toward the outside. Thus, it is possible to further reduce the time required for heating the laminated core 9.

EXAMPLES

Next, examples of the present invention will be described. The present inventor annealed the laminated core 9 through a method of heating the laminated core 9 using the first heater 1, and then cooling the laminated core 9. Then, temperatures of the laminated core 9 were measured during heating, and the effect of reducing the iron loss resulting from annealing was measured.

Figure 8:
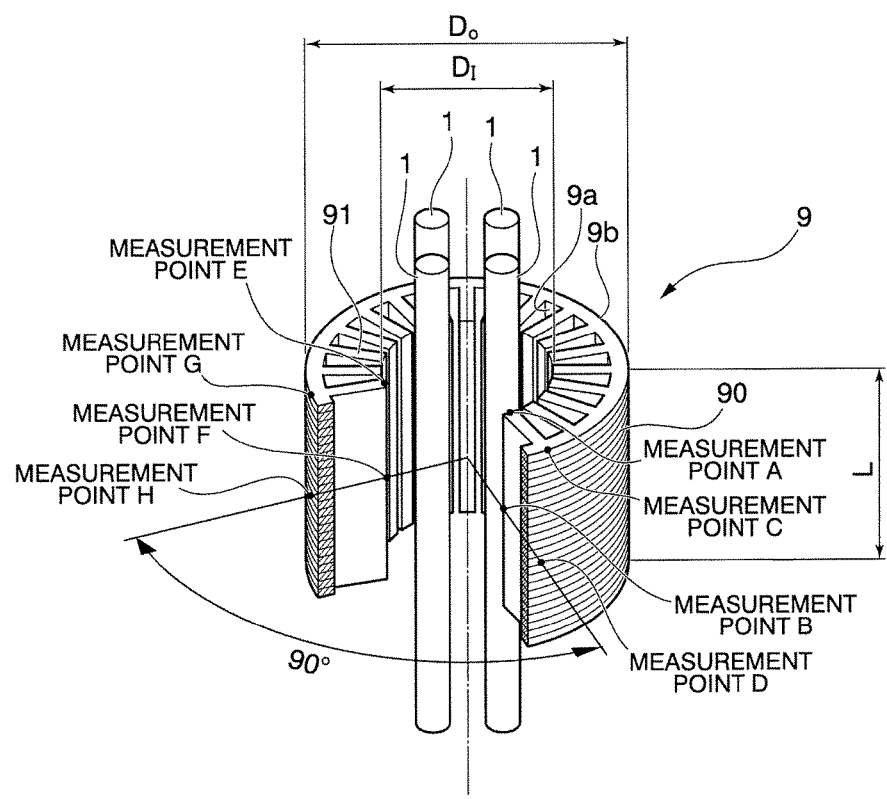
FIG. 8 is a perspective view schematically illustrating a structure of a laminated core used in Examples of the present invention, and temperature measurement points.

FIG. 8 is a perspective view schematically illustrating a configuration of the laminated core 9 used in the examples, and positions of points where temperatures were measured. As illustrated in FIG. 8, the laminated core 9 has a cylindrical configuration as a whole. Then, on the inner peripheral surface 9a of the laminated core 9, the teeth 91 protruding radially toward the center are formed. The laminated core 9 has an outside diameter (maximum) $D_O$ of approximately 180 mm, an inside diameter (minimum) $D_I$ of approximately 115 mm, and a length L in the central axis direction of approximately 55 mm. The number of measurement points for temperatures is eight, and the measurement points are denoted as A to H. The measurement points A and E are located at each end of the teeth 91 in the central axis direction of the inner peripheral surface 9a. The measurement points B and F are located at the center of the teeth 91 in the central axis direction of the inner peripheral surface 9a. The measurement points C and G are each located at the edge of the outer peripheral surface in the central axis direction. The measurement points D and H are located at the center of the outer peripheral surface in the central axis direction. Note that the measurement points A, B, C, and D are located at the same positions in terms of the circumferential direction. Similarly, the measurement points E, F, G, and H are located at the same positions in terms of the circumferential direction. Further, the measurement points A, B, C, and D are located so as to be positionally shifted from the measurement points E, F, G, and H by 90° in the circumferential direction.

As illustrated in FIG. 8, four bar-like halogen heaters are inserted in the inner space of the laminated core 9, and are arranged in the circumferential direction at equal intervals. The distance from the inner peripheral surface 9a of each of the teeth 91 of the laminated core 9 to each of the first heaters 1 is set to 25 mm.

Figure 9:
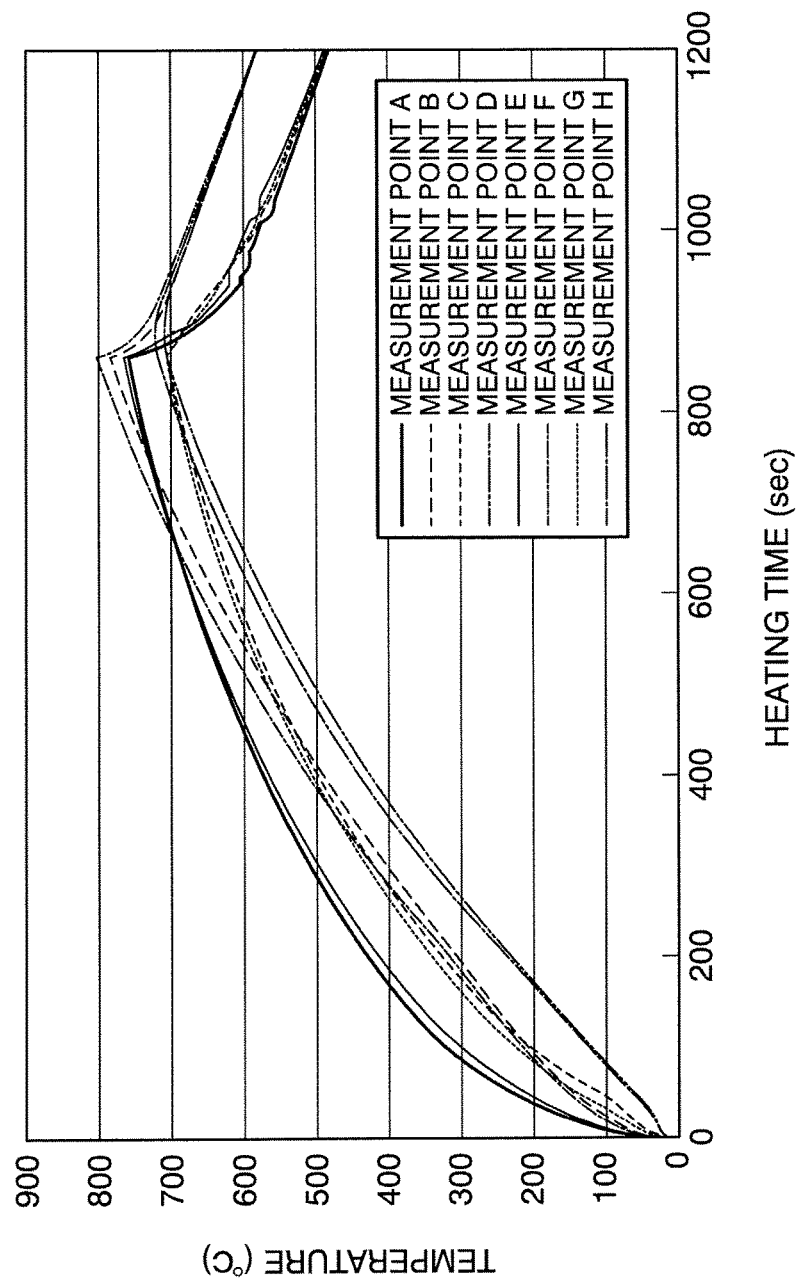
FIG. 9 is a graph showing changes with time in temperatures of a laminated core in Examples of the present invention.

Under the conditions described above, the laminated core 9 was heated for 870 seconds, and immediately after this, was gradually cooled (air cooled). In the heating, the electric power supplied to the first heaters 1 was set to approximately 2,550 W. Of the supplied electric power, approximately 86% of the power is converted into infrared light. Further, the light radiation length was set to 150 mm. Thus, the amount of heat radiated from the first heaters 1 was approximately 15 W/mm. FIG. 9 is a graph showing changes in temperatures at each of the measurement points. FIG. 10 is a table showing the maximum temperatures at each of the measurement points. As shown in FIG. 9 and FIG. 10, with the heating for 870 seconds, all the measurement points reached the target temperature of 700° C. or higher. As a result, compared to the case where annealing is not applied, the laminated core 9 having annealing applied thereto exhibited approximately a 15% reduction in iron loss.

As described above, with these examples, it is confirmed that the effect of reducing the iron loss resulting from annealing can be obtained by heating for 870 seconds. It is confirmed that, according to the examples of the present invention, it is possible to significantly reduce the heating time, while several hours of heating are required with the conventional method of annealing a laminated core employing the heating furnace. Further, it is confirmed that, according to the examples of the present invention, the effect of reducing the iron loss resulting from annealing can be obtained even if heating is not maintained after the laminated core 9 reaches the target temperature to make temperatures uniform. As described above, it is confirmed that, according to the examples of the present invention, it is possible to improve the productivity of the laminated core 9 by reducing the heating time.

These are detailed descriptions of the embodiments according to the present invention with reference to the drawings. However, the embodiments and examples described above are merely specific examples of embodying the present invention. The technical scope of the present invention is not limited to the embodiments and examples described above. It may be possible to make various modifications to the present invention within the scope thereof, and these are also included in the technical scope of the present invention.

For example, the numbers of the first heaters 1 and the second heaters 11 used for heating the laminated core 9 are not limited. The numbers of the first heaters 1 and the second heaters 11 are appropriately set depending on the size or shape of the laminated core 9 to be heated. Further, the configurations of the first heater 1 and the second heater 11 are not limited to the straightly shaped configuration. For example, the first heater 1 and the second heater 11 may be configured to have a U-shaped configuration. Moreover, in the embodiments described above, the configuration in which two laminated cores 9 are layered in the central axis direction and heated simultaneously is illustrated. However, the number of laminated cores 9 heated simultaneously is not limited. It may be possible to employ a configuration in which a single laminated core 9 is heated, or a configuration in which three or more laminated cores 9 are layered, and are heated simultaneously.

Further, in the descriptions above, the laminated core 9 formed by laminating electromagnetic steel sheets is used as the metal member. However, in the present invention, the metal member is not limited to the laminated core, and it is only necessary for the metal member to have a hollow cylindrical shape.

INDUSTRIAL APPLICABILITY

The present invention is applicable to annealing applied for removing strain in the laminated core formed by laminating electromagnetic steel sheets. Further, the present invention is applicable not only to annealing applied to the laminated core formed by laminating the electromagnetic steel sheets but also to annealing applied to various kinds of laminated cores.

BRIEF DESCRIPTION OF THE REFERENCE SYMBOLS

1: First heater
11: Second heater
2a: First separator
2b: Second separator
3: Chamber
9: Laminated core
9a: Inner peripheral surface of laminated core
9b: Outer peripheral surface of laminated core
90: Punched electromagnetic steel sheet
91: Tooth formed on inner peripheral surface of laminated core

The invention claimed is:

1. A method of annealing a metal member, the method comprising:
disposing a first heater in an inner space of a hollow cylindrical metal member having an inner peripheral surface provided with a plurality of teeth protruding toward a central direction, the first heater radiating an infrared light and being disposed so as to extend parallel to a direction of a central axis of the metal member; and
annealing including
heating the metal member throughout the entire length in the central axis direction uniformly 700° C. or higher from the inner space by the infrared light radiated from the first heater in a non-oxidizing environment; and
cooling the metal member after heating.

2. The method of annealing a metal member according to claim 1, wherein
a plurality of the first heaters are arranged in a circumferential direction at equal intervals.

3. The method of annealing a metal member according to claim 2, wherein
a first separator that acts as a block between the plurality of the first heaters is disposed so as to extend along the central axis of the metal member.

4. The method of annealing a metal member according to claim 3, wherein
the first separator is made of at least one of white ceramic and aluminum.

5. The method of annealing a metal member according to claim 2, wherein
each of the plurality of the first heaters is disposed between the plurality of teeth.

6. The method of annealing a metal member according to claim 5, wherein
a second separator that extends along the direction of the central axis of the metal member is disposed in the inner space of the metal member.

7. The method of annealing a metal member according to claim 6, wherein
the second separator is made of at least one of white ceramic and aluminum.

8. The method of annealing a metal member according to any one of claim 1 to claim 7, wherein
a plurality of the metal members are layered in the direction of the central axis,
the first heater is inserted in the inner space of the plurality of the metal members, and
the plurality of the metal members are heated simultaneously.

9. The method of annealing a metal member according to claim 8, wherein
the first heater is a halogen heater.

10. The method of annealing a metal member according to any one of claim 1 to claim 7, wherein
a second heater is further disposed on a side of an outer periphery of the metal member so as to extend parallel to the direction of the central axis of the metal member, and
the metal member is heated by the second heater from the side of the outer periphery.

11. The method of annealing a metal member according to claim 10, wherein
the second heater is a heater that radiates infrared light.

12. The method of annealing a metal member according to claim 11, wherein
the second heater is a halogen heater.

13. The method of annealing a metal member according to any one of claim 1 to claim 7, wherein
the metal member is a laminated core formed by laminating a plurality of electromagnetic steel sheets.

* * * * *